United States Patent [19]
Clark et al.

[11] Patent Number: 5,448,323
[45] Date of Patent: Sep. 5, 1995

[54] CLOSE-UP LENS ASSEMBLY INCORPORATING A PHOTO-RANGING SYSTEM

[75] Inventors: Peter P. Clark, Boxborough; Duncan C. Sorli, Chelmsford, both of Mass.

[73] Assignee: Polaroid Corporation, Cambridge, Mass.

[21] Appl. No.: 178,388

[22] Filed: Dec. 23, 1993

[51] Int. Cl.6 .................. G03B 13/20; G03B 15/03; G03B 1/18
[52] U.S. Cl. ............................ 354/167; 354/132; 354/149.1; 354/195.12
[58] Field of Search ............ 354/162, 163, 167, 132, 354/141, 149.1, 195.12

[56] References Cited

U.S. PATENT DOCUMENTS

| | | | |
|---|---|---|---|
| 3,416,426 | 12/1968 | Land | 354/162 |
| 3,418,908 | 12/1968 | Land | 354/167 |
| 4,777,501 | 10/1988 | Caimi et al. | 354/162 |
| 4,828,383 | 5/1989 | Kunishige et al. | 354/167 |
| 4,914,460 | 4/1990 | Caimi et al. | 354/162 |
| 5,142,299 | 8/1992 | Braun | 354/165 |

Primary Examiner—Michael L. Gellner
Assistant Examiner—Nicholas J. Tuccillo
Attorney, Agent, or Firm—John J. Kelleher

[57] ABSTRACT

A plurality of fixed focus exposure lenses are mounted in a turret for manual selection of a desired focus. Each exposure lens in the turret is combined with a pair of ranging lenses for movement therewith which direct light beams to converge at the sharpest subject focus distance of the exposure lens.

15 Claims, 3 Drawing Sheets

CLOSE-UP LENS ASSEMBLY INCORPORATING A PHOTO-RANGING SYSTEM

BACKGROUND OF THE INVENTION

1. Field of the Invention

This invention is related to a camera for close-up photography using a photo-ranging system to insure that the subject to be photographed is properly focused. The ranging system is used in combination with a selected one of a plurality of fixed focus lenses mounted at the front of the camera.

2. Description of the Prior Art

Cameras having the capacity to take close-up photographs are not new. An example of a camera used for close-up photography is the Acmel Macro Auto V6 camera manufactured by Acmel Corporation of Tokyo, Japan which involves a highly complicated system involving focal beams and a plurality of detachable lenses for different focal lengths. Each detachable lens is designed for a single subject distance. The resulting camera serves its purpose but is altogether too complicated for easy use by a camera operator. It is both bulky and heavy, weighing about 4½ pounds.

The use of converging light beams from a camera to determine a proper subject to camera distance is old art as disclosed in U.S. Pat. No. 3,416,426 which is specifically incorporated herein by reference. The theory disclosed therein and in other literature provides a light source reflected from spaced apart mirrors through a lens board to converge at the subject of the photograph. This technique is useful where several parameters remain constant, in particular, one of the constants is flash photography. With flash photography the duration of exposure is set and the only other variables are the exposure aperture and the focus of the lens.

U.S. Pat. No. 4,777,501 discloses a single pair of laser ranging lights of different wavelengths mounted to project converging light beams at the focal point of a single fixed focus exposure lens of the associated camera.

U.S. Pat. No. 4,914,460 discloses a single pair of light sources each of which projects a plurality of light beams in a particular pattern. The pattern is displayed on a surface which allows an observer to determine the topography of the surface and its distance from an associated camera. The camera is mounted equidistant between the two light sources.

U.S. Pat. No. 5,142,299 discloses an underwater camera mounted between a pair of light sources. The light sources project light beams to converge at the focal point of a single fixed focus lens system of the associated camera.

What is missing from the prior art is a camera for close-up photography having more that one focal length available to a user combined with a plurality of ranging systems to insure proper focus of the subject.

SUMMARY OF THE INVENTION

This invention solves that problem, in that, it incorporates a plurality of exposure lenses in a turret mounted on the front of the camera. The turret is mounted to rotate about an axis generally perpendicular to a line extending from the focal point of the exposure lens to the center of the exposure lens itself (i.e., the optical axis of the exposure lens). Each of the plurality of exposure lenses is of a different fixed focal length and magnification, from the other exposure lenses. The selected focal lengths listed subsequently are believed to be most frequently desirable for typical close-up photography for which this camera is designed.

Each exposure lens in the camera is combined with a pair of combination ranging light lens and prisms which are located on the turret diagonally across from each other on each side of the associated exposure lens. A combination of said transversely mounted prism-lenses and ranging lights are permanently focused and oriented to direct beams of light which intersect the axis of the exposure lens system. The two converging light beams may be observed visually at the sharpest subject focus distance of the exposure lens system. The photographer may simply observe the impinging beams of light from the two transversely mounted ranging lights as they impinge on the subject. A single spot of light existing on the subject formed by the two converging light beams indicates the subject is in focus through the exposure lens system. Two spots of light or a noncircular or oblong pattern indicates the subject is out of focus. Getting the subject in proper focus is achieved by moving the camera and/or rotating the turret to align a different exposure lens together with their associated ranging light lenses and prisms.

Each pair of ranging lights is coordinated with a single fixed focus exposure lens such that convergence of the light beams of the ranging lights occurs at the sharpest subject focus distance of the associated exposure lens. The photographer may manually select a desired focus distance by selecting the appropriate exposure lens and selection is made by rotating the turret. The combined pair of lenses for directing the ranging light beams are fixed in place on the turret and automatically move into operative position as the turret stops at the selected exposure lens.

Objects of the invention not understood from the above and the scope of applicability of the present invention will become apparent from the detailed description to follow taken in conjunction with the accompanying drawings in which like parts are designated by like reference characters.

DESCRIPTION OF THE PREFERRED EMBODIMENT

Figure 1:
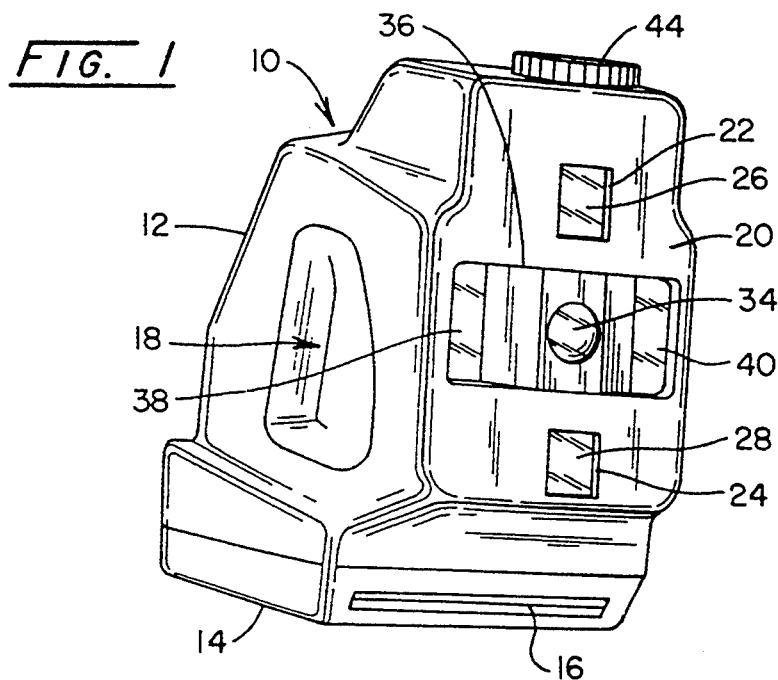
FIG. 1 is a perspective view of a camera having a plurality of exposure lenses and ranging light lenses mounted for selective use on a turret according to this invention.

This invention includes a camera 10 having an upper housing 12 and a lower housing 14 as shown in FIG. 1. The upper housing 12 encloses the lenses, lighting and the like. The lower housing 14 is preferably mounted to the upper housing 12 by a hinge (not shown) to allow it to swing away from the upper housing 12 for insertion of a cassette of film units to be mounted therein for later exposure.

While the embodiment illustrated in FIG. 1 shows an outlet slot 16 in lower housing 14 which is suitable for the expulsion of exposed film units of the instant photography type, this invention is not limited to instant photography. It is however specifically intended for close-up photography involving flash units and converging light beams to serve as the ranging system for proper focus of the exposure lens.

FIG. 1 illustrates the camera 10 having a pair of hand grips 18 (only one being shown) to allow easy manual support for the camera. The front 20 of the camera 10 includes a plurality of apertures including a pair of rectangular openings 22, 24 to accommodate lenses 26, 28. Lenses 26, 28 focus beams of light 30, 32 (FIG. 3), respectively, at a particular point forward of camera front 20 corresponding to the sharpest subject focus distance of an exposure lens 34 mounted in opening 36 equidistant between a pair of flash or strobe units 38, 40.

Figure 2:
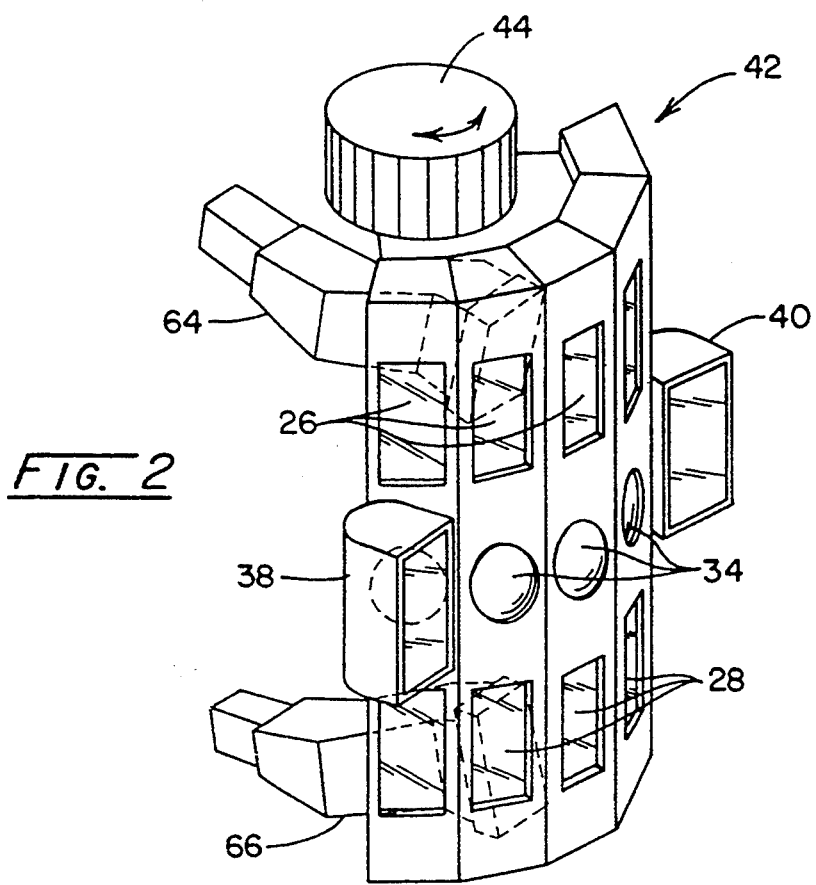
FIG. 2 is a fragmentary perspective view of the turret, light and lens orientation of the camera of FIG. 1.
Figure 3:
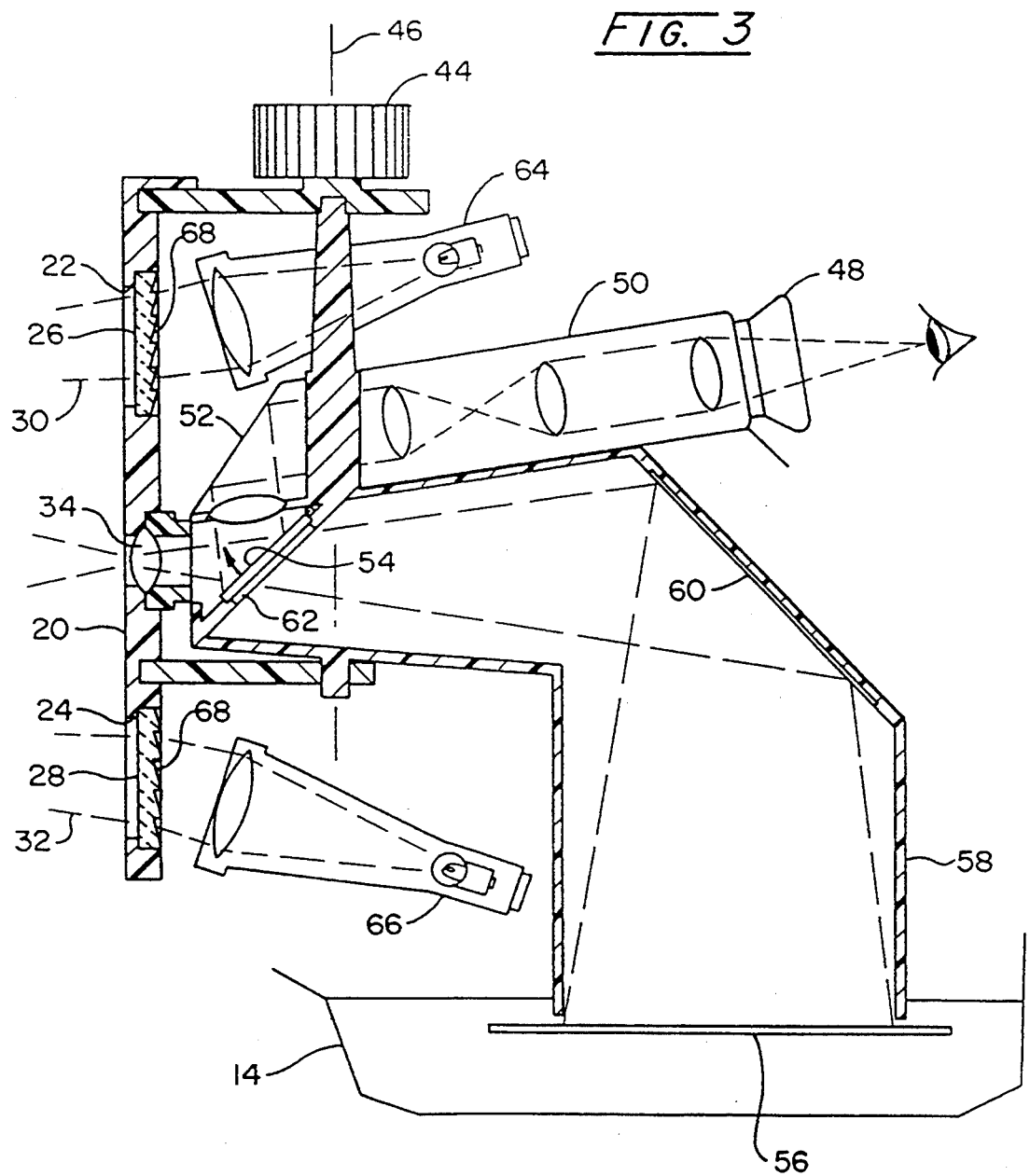
FIG. 3 is a fragmentary sectional view of the general orientation of the camera, adjustable turret, lens and lighting combination of the invention.

Looking to FIGS. 2 and 3, the camera is partially illustrated in schematic fashion to bring out the inventive features described herein. A turret 42 is mounted adjacent front face 20 for adjusting the camera to a desired focus distance. An adjusting dial or knob 44 projects upwardly from the top of upper housing 12 and is in suitable position for easy manual operation. Rotation of dial 44 rotates the light beam focusing lenses 26, 28 and the exposure lenses 34 about an axis 46 which allows for the placement of the desired light beam focusing lenses and exposure lens combination into a desired position. It will be observed that the flash units 38, 40 remain stationary in opening 36 while each set of three lenses shifts into operative position. That is, there are five different exposure lenses 34 which may be adjusted into operable position by rotating knob 44 and each lens 34 has a different fixed focal length. Each exposure lens 34 is supported in combination equidistant between a pair of light focusing ranging lenses 26, 28. Each pair of ranging lenses 26, 28 is coordinated with its associated exposure lens 34 such that the directed beams of light 30, 32 converge at the sharpest subject focus distance of the associated exposure lens 34. For convenience, light beams 30, 32 are circular in their projection and at the focus of the associated exposure lens 34, the beams converge to a single circular pattern. Accordingly, the camera operator views the subject to be photographed through an eyepiece 48 oriented with a viewing optical system 50 and a pair of mirrors 52, 54 such that the operator sees the subject to be photographed along a viewing path coaxial with the optical axis of the exposure lens 34. Should the operator observe the ranging lights forming an egg shaped pattern or two separate circles, the camera must be moved closer or further away from the subject to get to the focus point where the pattern becomes a single circular spot and a subject thereat will be in focus.

Similarly, a photographic film unit 56 in lower housing 14 is aligned with a passageway 58 in camera 10 having a mirror 60 oriented to reflect light entering the camera through exposure lens 34 onto a light sensitive surface of the film unit 56.

It will be observed that the FIG. 3 illustration shows a pivotable shutter 62 blocking the light passageway 58 between film unit 56 and exposure lens 34. Shutter 62 supports mirror 54 to reflect light into the viewing passageway 50 toward eyepiece 48. A conventional mechanism automatically deflects shutter 62 upward and then back to its initial light blocking position to generate an exposure interval whenever the shutter is actuated. Such structure is not illustrated as it is well known in the art.

Ranging light sources 64, 66 are illustrated as being stationary such that only two are needed. To get the proper focus, prisms 68 are formed in ranging light ranging lenses 26, 28 to direct beams 30, 32 correctly. In fact, the ranging lights 64, 66 may be oriented such that ranging lens 26, 28 are unnecessary in use with one of the five exposure lens 34, whereas, the other four sets of ranging light focusing lenses require specially structured lenses to property focus the ranging lights 64, 66. The ranging lenses 26, 28 are shown as fresnel lenses for compactness and ease of manufacture. The source of light for ranging lenses 26, 28 may be a single light or a plurality of lights if desired but, the preferred embodiment uses two sources as illustrated.

In the preferred embodiment, the levels of magnification and their associated subject distances for exposure lens 34 are $3\times@3.4$ in.; $2\times@5.1$ in.; $1\times@10.2$ in.; $0.4\times@25.8$ in.; and $0.2\times@51.7$ in. It will be quite clear that these magnifications and subject distances are only preferred examples and any desirable different parameters may be used without departing from the inventive concept. In addition, the structure illustrating the invention shows the axis 46 of the turret to be vertical. It could as easily be horizontal.

The duration of the light output from the pair of strobe lights 38, 40 is dependent upon the particular subject distance and relative aperture (f-number) of an exposure lens 34 which is in operative position at the time of taking a photograph. Preferably the duration of lighting by the strobe lights 38, 40 is controlled automatically when the desired exposure lens 34 is positioned to its operative position by rotating knob 44 and no separate adjustment is necessary, it being controlled within the camera mechanism itself in a manner well known in the art as functionality depicted in the block diagram of FIG. 4.

In operation, a photographer observes the subject to be photographed through eyepiece 48 after an adjustment has been made of the knob 44 to place the appropriate exposure lens 34 in operative position. The desired exposure lens 34 is based on subject distance and the degree of magnification desired by the photographer. Preferably, indicia associated with knob 44 assists the photographer in this determination.

Adjusting the desired exposure lens 34 into operative position automatically locates the proper pair of ranging light focusing lenses 26, 28 into proper position to direct light beams 30, 32 to converge at the sharpest subject focus distance of exposure lens 34.

The operator views the subject through eyepiece 48 and may also observe the light pattern from light beams 30, 32 impinging on the subject. If the light pattern is a single circle, the subject is in focus with exposure lens 34 and the shutter 62 may be actuated.

Figure 4:
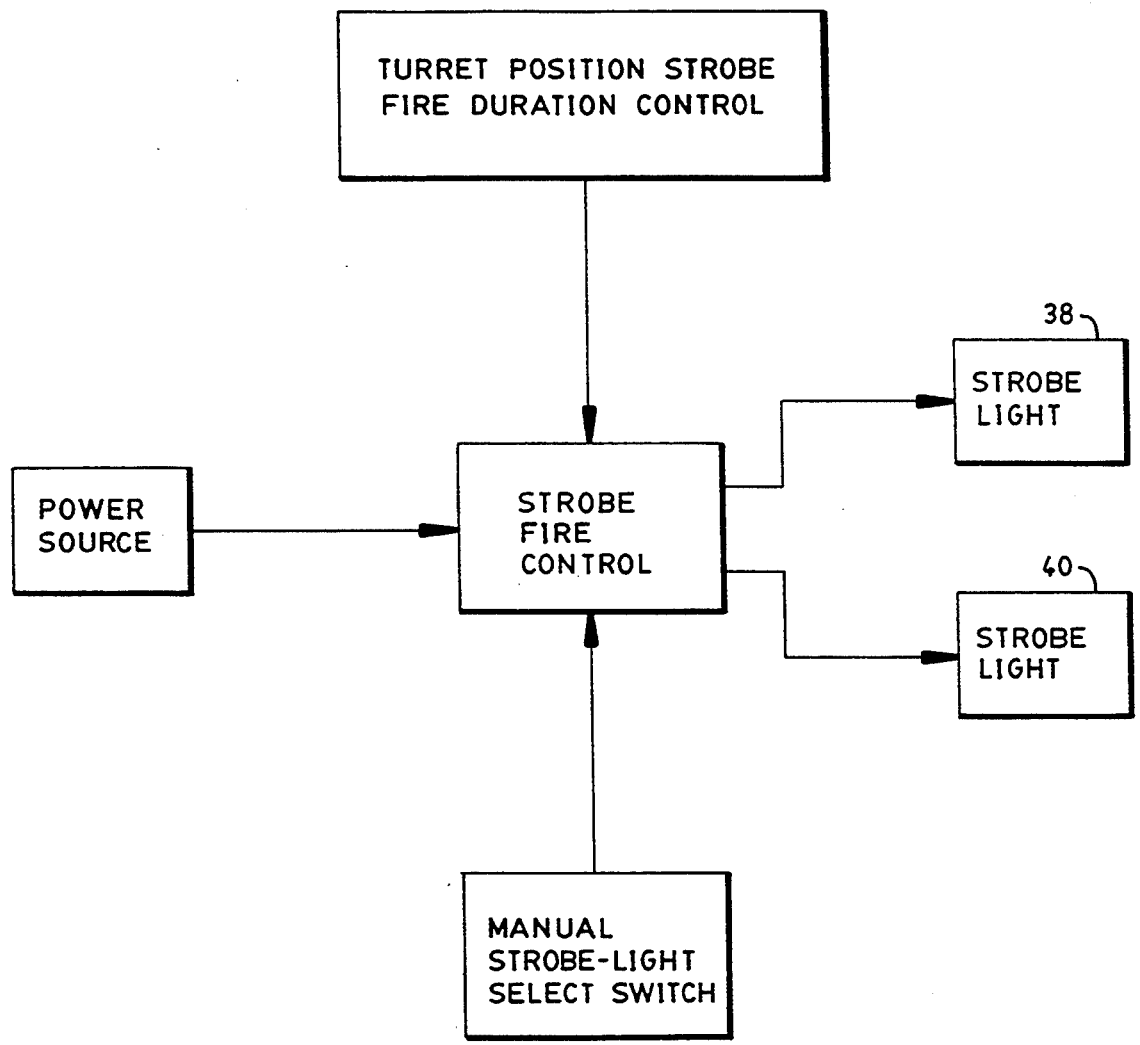
FIG. 4 is a block diagram of the manual select switch and turret position control of the strobe lights in the close-up camera of the present invention.

Strobe lights 38, 40 operate in the manner built into the camera structure and may or may not be based on a quenching or adjustable duration of light. Indeed, as shown in FIG. 4, the preferred embodiment may include a switch to disenable one or both of strobe lights 38, 40 at the discretion of the photographer. This may be a desirable feature depending upon the effect the photographer is trying to achieve.

The particular feature of this invention which distinguishes it from products on the market is its simplicity and low cost for close-up photography. The turret mechanism described herein allows a plurality of different fixed focal length exposure lenses 34 together with their corresponding light beam focusing lenses of a photo-imaging system to be adjusted into and out of operative position by an easy manual operation not elsewhere available.

This invention may be practiced or embodied in still other ways without departing from its spirit or essential character. The embodiment described herein is therefore illustrative and not restrictive, the scope of the invention being indicated in the appended claims and all variations which come within the meaning of the claims are intended to be embraced thereby.

We claim:

1. A camera having more than one film exposure lens with each such lens having a related ranging system, comprising:
    at least two exposure lenses, each of said exposure lenses having a fixed focal length which is different from the focal length of another exposure lens;
    at least two ranging systems, said ranging systems including a source of light directed to a pair of light focusing ranging lenses, with at least one of said film exposure lenses being mounted in fixed relationship between one of said pairs of light focusing lenses and with each of said exposure and ranging lenses being mounted for movement about a common axis, each pair of focusing lenses combining to focus beams of light from said light source to converge at the sharpest subject focus distance of the related exposure lens mounted therebetween; and
    an adjustor for locating a desired combination of a pair of light focusing lenses and a related exposure lens in operative position to take a photograph.

2. The camera of claim 1 wherein said adjustor comprises a turret mounted at the front of said camera to rotate about an axis perpendicular to a line extending from said point of convergence of said beams of light through the principal optical axis of said exposure lens.

3. The camera of claim 2 wherein said source of light comprises a pair of light sources mounted on said camera and not movable by said adjustor.

4. The camera of claim 3 further comprising a flash exposure light mounted at the front of said camera, said exposure light being adjustable as to duration of lighting based upon the subject distance and relative aperture of said exposure lens in said operative position.

5. The camera of claim 4 wherein said flash exposure light comprises a pair of flash exposure lights with said exposure lens located intermediate said flash exposure lights.

6. The camera of claim 1 wherein said source of light comprises a pair of light sources mounted on said camera and not movable by said adjustor.

7. The camera of claim 4 including a flash exposure light mounted at the front of said camera, said exposure light being adjustable as to duration of lighting based upon the subject distance and relative aperture of said exposure lens in said operative position.

8. The camera of claim 7 wherein said flash exposure light comprises a pair of flash exposure lights with said exposure lens located intermediate said flash exposure lights.

9. The camera of claim 2 including a flash exposure light mounted at the front of said camera, said exposure light being adjustable as to duration of lighting based upon the subject distance and relative aperture of said exposure lens in said operative position.

10. The camera of claim 9 wherein said flash exposure light comprises a pair of flash exposure lights with said exposure lens located intermediate said flash exposure lights.

11. The camera of claim 1 including a flash exposure light mounted at the front of said camera, said exposure light being adjustable as to duration of lighting based upon the subject distance and relative aperture of said exposure lens in said operative position.

12. The camera of claim 11 wherein said flash exposure light comprises a pair of flash exposure lights with said exposure lens located intermediate said flash exposure lights.

13. The camera of claim 3 including a flash exposure light mounted at the front of said camera, said exposure light being adjustable as to duration of lighting by adjusting said turret.

14. The camera of claim 2 including a flash exposure light mounted at the front of said camera, said exposure light being adjustable as to duration of lighting by adjusting said turret.

15. The camera of claim 5 including a manual switch to control the number of flash exposure lights activated upon operation of said camera.

* * * * *